(12) United States Patent
Jackson, Jr. et al.

(10) Patent No.: US 9,927,041 B2
(45) Date of Patent: Mar. 27, 2018

(54) FLUID CONTROL VALVE UTILIZING SHAPE MEMORY ALLOY DRIVING SPRING

(71) Applicant: A. Raymond & Cie, Grenoble (FR)

(72) Inventors: Nicholas Jackson, Jr., Davisburg, MI (US); Albert Raymond, Claix (FR)

(73) Assignee: A. Raymond et Cie, Grenoble (FR)

( * ) Notice: Subject to any disclaimer, the term of this patent is extended or adjusted under 35 U.S.C. 154(b) by 343 days.

(21) Appl. No.: 14/472,646

(22) Filed: Aug. 29, 2014

(65) Prior Publication Data
US 2016/0061344 A1 Mar. 3, 2016

(51) Int. Cl.
*F16K 31/00* (2006.01)
*F16K 1/22* (2006.01)
*G05D 23/02* (2006.01)

(52) U.S. Cl.
CPC ............ *F16K 31/002* (2013.01); *F16K 1/221* (2013.01); *G05D 23/026* (2013.01)

(58) Field of Classification Search
CPC .. F16K 31/002; F16K 3/184; F16K 31/52458; F16K 31/508; F16K 31/528; F16K 31/5286; F16K 31/504; F16K 5/06; F16K 27/067; F16K 1/22; F16K 1/221; F16K 31/5282; G05D 23/026
USPC ......... 251/11, 251, 309, 253, 263, 262, 226, 251/227, 254, 301; 137/556; 236/23, 236/101 C
See application file for complete search history.

(56) References Cited

U.S. PATENT DOCUMENTS

| 2,883,144 | A | * | 4/1959 | Kendig | F15B 15/068 251/229 |
| 5,134,823 | A | * | 8/1992 | Laughon | E04F 19/062 52/718.02 |
| 5,427,138 | A | * | 6/1995 | Ochiai | B60T 11/18 137/468 |
| 6,032,920 | A | * | 3/2000 | Takahashi | F02D 9/06 137/907 |
| 6,113,063 | A | * | 9/2000 | Takahashi | F02D 9/06 137/907 |
| 2011/0315903 | A1 | * | 12/2011 | Sohn | F03G 7/065 251/11 |

* cited by examiner

*Primary Examiner* — Craig J Price
*Assistant Examiner* — Andrew J Rost
(74) *Attorney, Agent, or Firm* — LeClairRyan

(57) ABSTRACT

A fluid control valve having a shape memory alloy spring for moving a valve member between an open position and a closed position is provided. The valve includes a valve assembly cylinder, a valve assembly cap fitted to the cylinder, a fluid inlet and a fluid outlet associated with the cylinder, a first member having a cam follower groove, a second member having a cam operatively associated with the groove, a fluid flow gate associated with one of the members as well as the inlet and the outlet, a return spring associated with one of the members, and the shape memory alloy spring associated with one of the members. The length of the shape memory alloy spring changes in response to changes in temperature. The first member is either a rotating valve or a reciprocating member. The second member is either a reciprocating ring or a rotating valve cylinder.

9 Claims, 12 Drawing Sheets

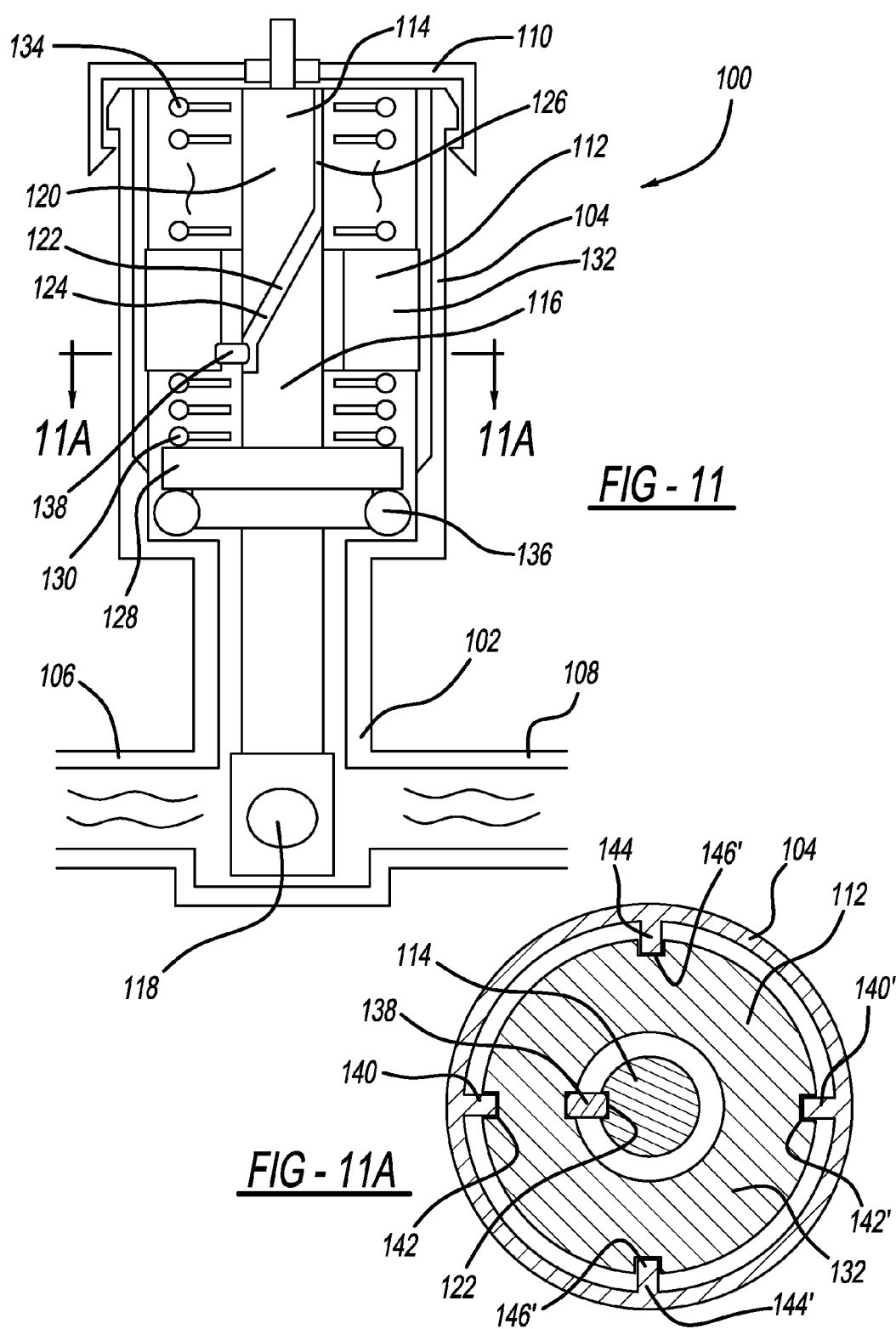

FLUID CONTROL VALVE UTILIZING SHAPE MEMORY ALLOY DRIVING SPRING

TECHNICAL FIELD

The disclosed inventive concept relates generally to control valves for regulating the flow of fluids. More particularly, the disclosed inventive concept relates to a fluid control valve having a shape memory alloy spring that provides the driving force for the movement of the valve.

BACKGROUND OF THE INVENTION

Control valves for the regulation of fluid flow are found in a great variety of applications in a wide array of industries. For example, in automotive vehicles, fluid control valves are used in the regulation of both lubricant and coolant flow.

The conventional fluid control valve includes a valve body having a valve assembly cylinder, an inlet port and an outlet port. The conventional fluid control valve further includes a rotatably movable valve positioned within the valve assembly cylinder of the valve body. The rotatably movable valve includes a valve stem and a gate or cone or other means for interfering with the flow of a fluid through the body by movement into or out of a valve seat formed in the valve body. To close the valve, the gate or cone is brought into contact with the seat formed in the valve body. A return spring is conventionally provided to selectively return the valve to either the closed or open condition.

It is known in the art to use shape memory alloy in the production of valves. Shape memory alloy is lightweight material that experiences deformation in response to thermal dynamics. This alloy provides a good alternative to hydraulic, pneumatic or motorized actuators. When heated either by ambient temperature or by an electric current, shape memory alloy assumes its original, non-deformed shape. When cooled, shape memory alloy assumes a deformed shape.

While shape memory alloys may be formed from a variety of alloyed material, the most common types are alloys of copper-aluminum-nickel and nickel-titanium. Shape memory alloy can exist in two phases, the first being an austenite phase and the second being a martensite phase. The latter phase is achieved when the alloy is subjected to cooling.

Valves that utilize shape memory alloy today can be divided into two categories. The first category includes shape memory alloy valves having linear displacement mechanisms. The second category includes shape memory alloy valves having complex rotatable systems.

Examples of both types of valves are known in the art. Of the former type, reference may be made to U.S. Pat. No. 6,427,712, issued on Aug. 6, 2002, to Ashurst for AMBIENT TEMPERATURE SHAPE MEMORY ALLOY ACTUATOR. This reference teaches an actuator that includes a valve having a stem 13 and a plug 10 positioned at the end of the stem 13. An SMA spring 14 works in conjunction with a bias spring 15 to move the stem 13 and its associated plug 10 between opened and closed positions relative to a drain hole 20. According to this reference, "[m]ovement of stem 13 (the actuating element) between the two positions may be substantially linear."

An additional example of a valve that incorporates a shape memory alloy to function linearly may be found in UK Patent Application 2 107 829 A, filed on Mar. 18, 1982, by Dudley Vernon Steynor for THERMOSTATIC VALVES AND SOLAR WATER HEATING SYSTEMS INCORPORATING SAME. According to this reference, a "displaceable valve member [2] may comprise a poppet-type valve member which is normally biased by a spring [5] towards its seat [3], i.e., towards a valve-closed position. The shape memory effect (SME) actuator may comprise a coil spring [8] formed from an SME brass, for example, a Delta metal alloy, which expands and contracts axially with respective increases and decreases in temperature."

A further example of a valve that incorporates a shape memory alloy to function linearly may be found in Korean Patent Application 20100035500 A, filed Apr. 5, 2010, by Pak Sil Sang for AUTOMATIC THERMOSTATIC CONTROL VALVE. According to this reference, the automatic temperature control valve includes "a bias spring [3] and a shape memory alloy spring [12] in an overlapped state." The bias spring 3 and the shape memory alloy spring 12 overlap. The valve allows for the automatic bypass of a supply of water when the valve senses that the temperature of the water changes. The shape memory alloy spring 12 reacts to the change in water temperature and selectively allows or restricts the passage of water thereby.

Of the latter type of valve that includes shape memory alloy valves having complex rotatable systems. reference may be made to U.S. Pat. No. 8,172,811, issued on May 8, 2012, to Roe for DRUG DELIVERY PUMP DRIVE USING A SHAPED MEMORY ALLOY WIRE. This patent is directed "to a drug delivery pump drive using a shape memory alloy to advance a plunger piston to deliver a liquid drug from a container." Particularly, "a SMA wire [12] is provided in a linear solenoid arrangement [110] with a spring return [122] to provide reciprocating linear motion. A set of concentric (inner and outer) tubes [124, 126] having matching facing helical slots [130] with bearings [132] therebetween is provided to convert the reciprocating linear motion into reciprocating rotary motion." The patented pump drive of this patent is thus highly complex and costly to manufacture.

An additional example of a known shape memory alloy valves having a complex rotatable system is found in U.S. Pat. No. 6,684,904, issued on Feb. 3, 2004, to Ito for VARIABLE PRESSURE VALVE APPARATUS. This patent is directed to a valve that is provided with a shape memory spring. According to this patent, "[w]hen the shape memory alloy spring varies in length, a feed ratchet performs linear movement to rotate a cam wheel." Specifically, "a temperature change cause deformation in the shape memory alloy spring 10 and expands or extends the shape memory alloy spring 10 to press an end face of a large diameter part of the feed ratchet 12 toward the return spring 11." The feed ratchet 12 is thus rotated and causes a cam wheel 13 to move a surge spring 15 that acts upon a ball valve 17. The patented variable pressure valve of this patent is also highly complex and costly to manufacture.

As the above-discussed references illustrate, known fluid control valves that incorporate shape memory alloy biasing elements are either ineffective at translating linear motion into rotary motion or are of complex designs and have numerous parts, both aspects contributing to an expensive valve that may be difficult to produce and maintain. In addition, known valves do not provide for gradual changes in the position of the valve in response to certain conditions, such as temperature.

Accordingly, as in so many areas of valve technology, there is room in the art of fluid flow controlling valves for a practical and effective valve that is relatively inexpensive to produce and to maintain, that efficiently converts linear motion to rotary motion, and which provides infinite and selectable changes in position.

SUMMARY OF THE INVENTION

The disclosed inventive concept provides a fluid control valve that overcomes the challenges encountered through the use of valves according to current technology. A shape memory alloy spring provides the driving force for movement of a valve member that regulates the flow of fluid by transforming linear motion to rotary motion that overcomes the limitations of the prior art.

The shape memory valve of the disclosed inventive concept provides a fluid control valve having a valve assembly cylinder, a valve assembly cap fitted to the cylinder, a fluid inlet and a fluid outlet associated with the cylinder, a first member having a cam follower groove, a second member having a cam operatively associated with the groove, a fluid flow gate associated with one of the members as well as the inlet and the outlet, a return spring associated with one of the members, and a shape memory alloy spring associated with one of the members. The shape memory alloy spring provides the driving force for movement of the valve between a first position and a second position. The shape memory alloy spring responds to changes in temperature.

The shape memory alloy valve of the disclosed inventive concept may be one of at least two embodiments. In the first embodiment, the first member on which the cam follower groove is formed is a rotating valve to which the flow gate is attached. The rotating valve has a flow direction indicator. The cam follower groove is formed on the rotating valve wherein the groove includes an arcuate portion and a straight portion. In the first embodiment the second member is a reciprocating ring having at least one anti-rotation rib formed thereon. The valve assembly cylinder has an inner wall on which at least one rib-receiving groove formed.

According to the second embodiment of the shape memory valve of the disclosed inventive concept, the first member on which the cam follower groove is formed is a reciprocating member. The valve assembly cap is locked against rotation. The reciprocating member has a fluted stem extending therefrom. The fluted stem reciprocatingly mates with a slot formed in the valve assembly cap.

The second member is a rotating valve cylinder having the flow gate fitted thereto. According to this embodiment, the rotating valve cylinder has an inner wall and the cam follower extends from said inner wall.

Regardless of the embodiment, the shape memory alloy valve of the disclosed inventive concept allows for gradual and regulated changes in the position of the valve for accurate and controllable flow regulation. The speed of rotation of the valve may be adjusted by selecting between a number of variables that include, for example, thickness and length of the shape memory alloy spring. As a particular example, a thicker coil would allow for a slower rate of change based on changes in temperature. A longer spring would effect a more dramatic rotation of the valve when subjected to a temperature change. A specific selection of the material being alloyed would also achieve a more controlled movement of the spring over a given temperature change. If the temperature of the shape memory alloy spring is changed according to an electric current, the amount of current may be selectively varied to achieve a specific shape change in the spring.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference is now made to the embodiments illustrated in greater detail in the accompanying drawings and described below by way of examples of the invention wherein:

FIG. 11 is a longitudinal sectional view of a valve having a shape memory alloy spring for moving a valve member according to a second embodiment of the disclosed inventive concept in which the valve is shown in its closed position;

FIG. 11A is a view taken along line 11A-11A of FIG. 11;

DETAILED DESCRIPTION OF THE PREFERRED EMBODIMENT

Figure 1:
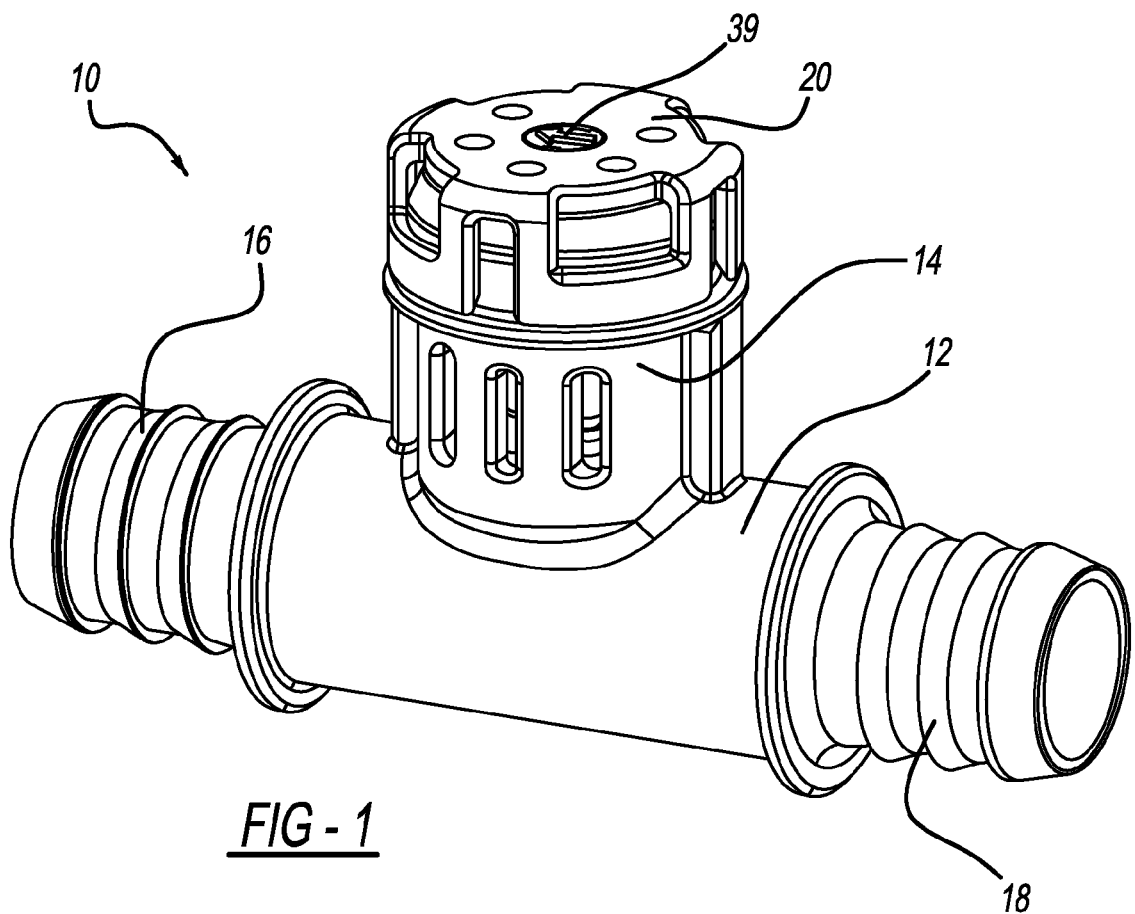
FIG. 1 is a perspective view of an indicator valve having a shape memory alloy spring for moving a valve member according to a first embodiment of the disclosed inventive concept.
Figure 2:
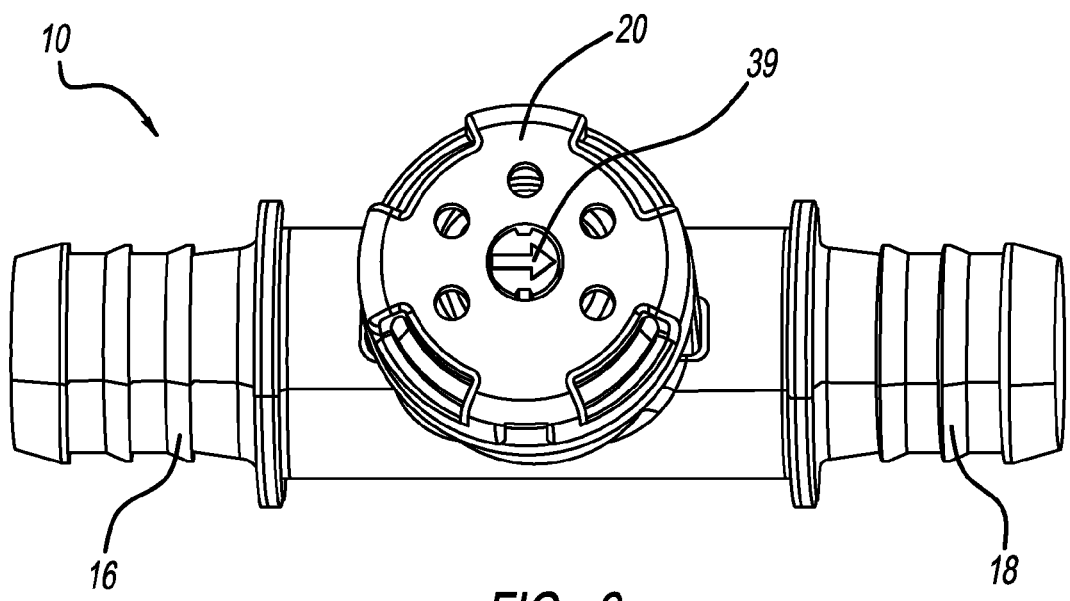
FIG. 2 is a slightly off-center top view of the valve of FIG. 1.

In the following figures, the same reference numerals will be used to refer to the same components. In the following description, various operating parameters and components are described for different constructed embodiments. These specific parameters and components are included as examples and are not meant to be limiting.

FIGS. 1 through 10 illustrate a first embodiment of the valve of the disclosed inventive concept, generally illustrated as 10. The valve 10 may be used in any environment where the flow of a liquid or a gas needs to be selectively regulated. The valve 10 includes a substantially T-shaped body 12 having a valve assembly cylinder 14, a first port 16 and a second port 18. Of the first port 16 and the second port 18, one is an inlet port and the other is an outlet port. The long axis of the first port 16 is aligned with the long axis of the second port 18, though this is not necessarily the case. As further illustrated in these same figures, the first port 16 and the second port 18 are disposed at right angles with respect to the valve assembly cylinder 14, though this is also not necessarily the case.

The valve 10 further includes a valve assembly cap 20. The valve assembly cap 20 is preferably snap-fitted to the valve assembly cylinder 14, though it may also be attached to the valve assembly cylinder 14 by threading.

Figure 3:
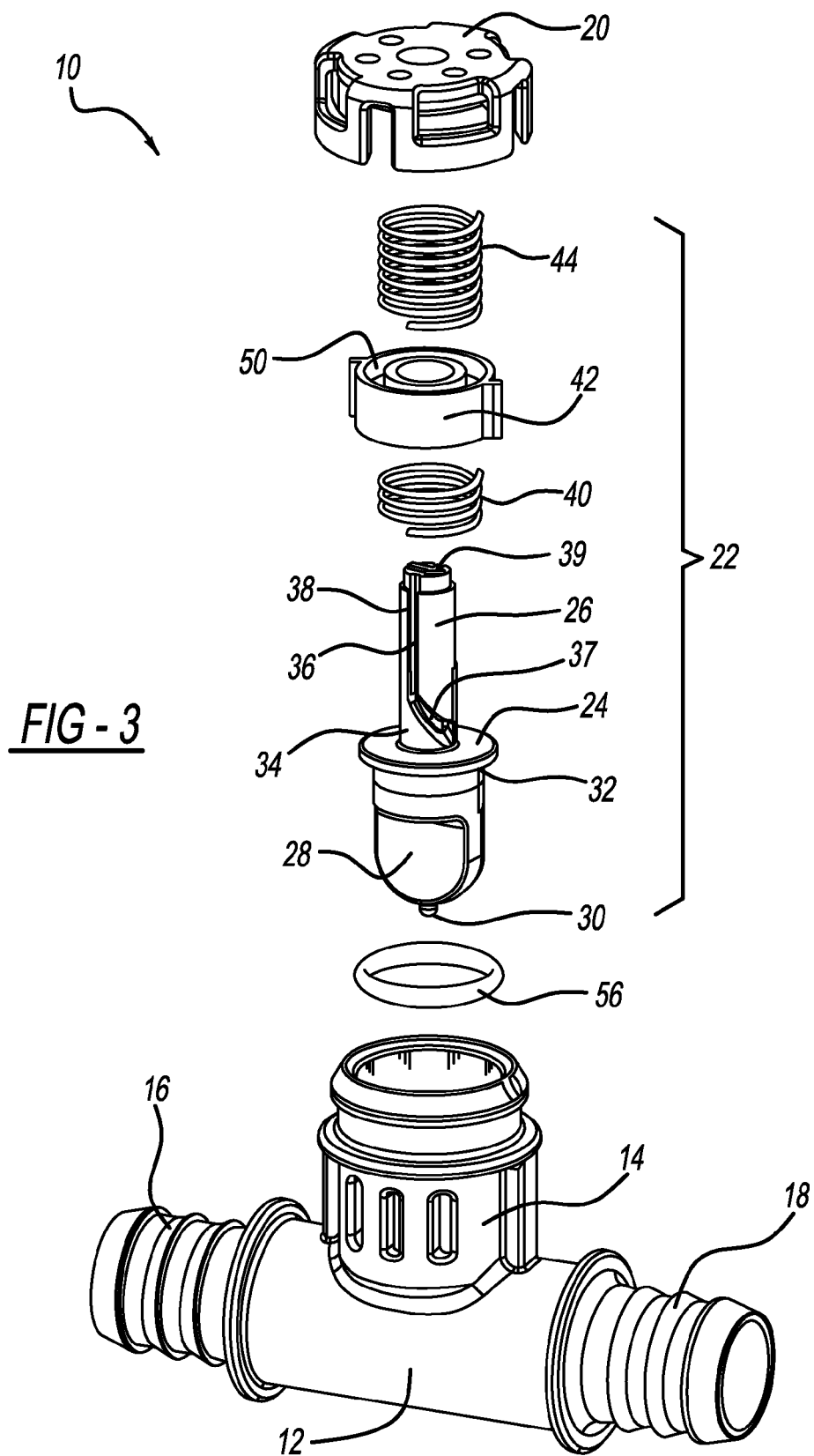
FIG. 3 is an exploded view of the valve of FIG. 1.

Referring to FIG. 3, an exploded view of the valve 10 of the disclosed inventive concept is illustrated. A valve assembly 22 is provided substantially within the valve assembly cylinder 14. The valve assembly 22 includes a rotatable valve 24 having a valve stem 26 and a flow gate 28. A locator pin 30 extends from the flow gate 28. Formed at the juncture of the valve stem 26 and the flow gate 28 is a peripheral ring 32.

The valve stem 26 includes a peripheral wall 34 having a cam follower groove 36 formed therein. The cam follower groove 36 includes an arcuate portion 37 for effecting rotary motion of the rotatable valve 24 (as is discussed below) and a linear portion 38 that allows for assembly of the valve assembly 22. The arcuate portion 37 is continuous with the linear portion 38.

At the uppermost end of the valve stem 26 is provided a visual indicator 39. The visual indicator 39 provides visual confirmation as to whether the valve 10 is opened or is closed. The visual indicator 39 may be an arrow (as illustrated in, for example, FIG. 2) or may be another type of demarcation. By way of the visual indicator 39, the opened or closed status of the valve 10 can be readily determined at a glance by viewing the direction of an arrow.

Figure 4:
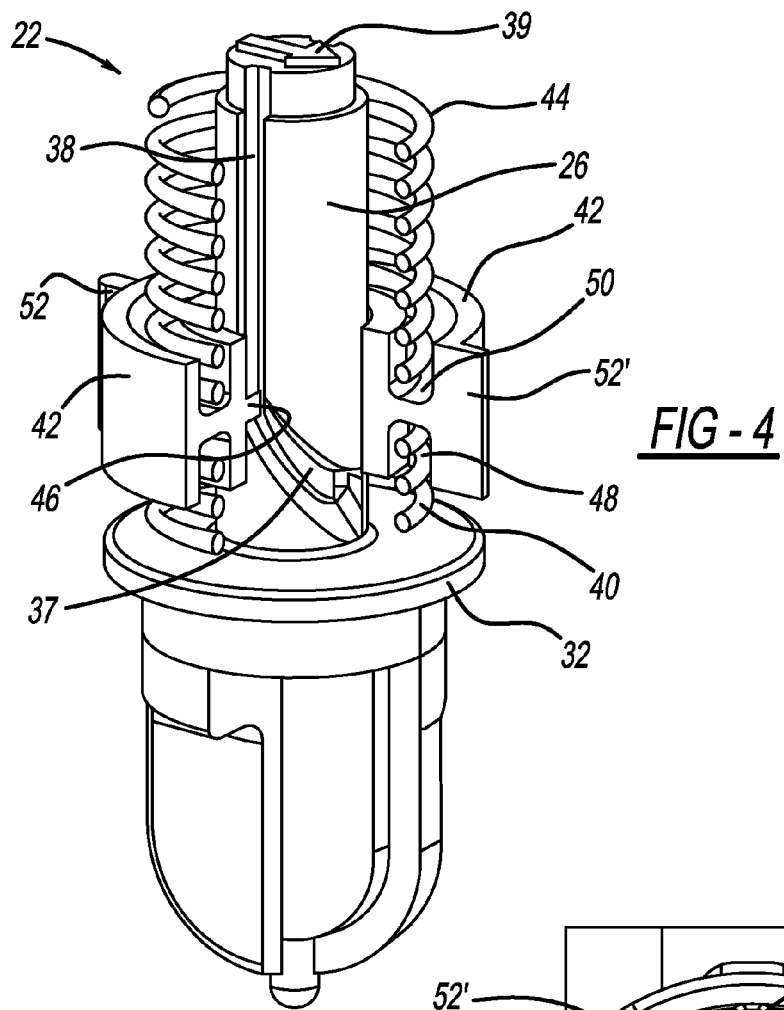
FIG. 4 is a perspective view of the valve assembly of the valve of FIG. 1 with portions cut away.

The valve assembly 22 further includes a shape memory alloy spring 40, a reciprocating ring 42, and a return spring or biasing member 44. The shape memory alloy spring 40 changes shape in response to changes in temperature. One end of the shape memory alloy spring 40 rests against the peripheral ring 32 while the other end of the shape memory alloy spring 40 rests in a groove 48 formed on one side of the reciprocating ring 42. One end of the return spring 44 rests against the cap 20 while the other end of the return spring 44 rests in a groove 50 formed on the other side of the reciprocating ring 42. Both the groove 48 and the groove 50 are illustrated in FIG. 4. It is to be understood that while the shape memory alloy spring 40 and the return spring 44 are illustrated as being internally provided with respect to the valve 10, either or both springs may be positioned externally.

Figure 5:
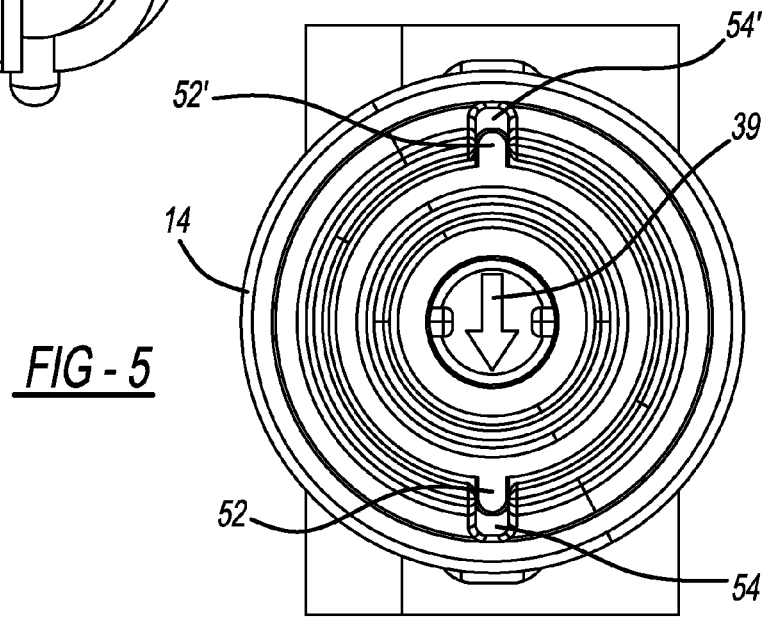
FIG. 5 is an end view of the valve of FIG. 1.

FIG. 4 further illustrates the various elements of the valve assembly 22 in their relative positions. For clarification, portions of the shape memory alloy spring 40, the reciprocating ring 42, and the return spring 44 are shown cut away. The cut away view of the reciprocating ring 42 illustrates a cam follower 46 that is fitted into the cam follower groove 36 formed in the valve stem 26 of the rotatable valve 24. The reciprocating ring 42 includes opposed anti-rotation ribs 52 and 52' that move linearly within opposed grooves 54 and 54' formed in the interior cylindrical wall of the valve cylinder 14 as illustrated in FIG. 5.

Figure 6:
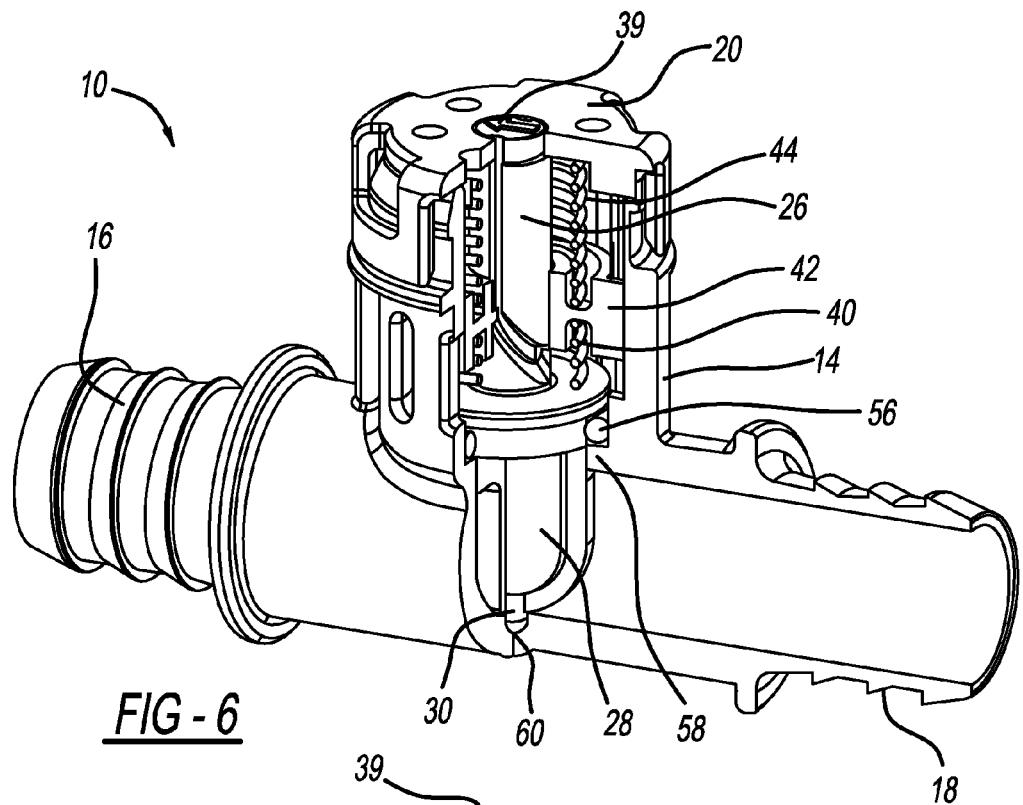
FIG. 6 is an end view of the valve of FIG. 1 with portions cut away illustrating the valve assembly shown in FIG. 4 in its opened position.

FIG. 6 illustrates the valve assembly 22 disposed within the valve assembly cylinder 14. As illustrated in FIG. 4, the valve assembly 22 is shown with portions of the shape memory alloy spring 40, the reciprocating ring 42, and the return spring 44 cut away. The flow gate 28 is illustrated in its open position. An O-ring 56 provides a fluid-tight seal between the peripheral ring 32 and a seat 58 formed within the valve assembly cylinder 14. Additional O-rings may be provided as necessary. The locator pin 30 extending from the flow gate 28 is rotatably seated within a recessed area 60.

The action between the cam follower 46 and the cam follower groove 36 translates linear motion of the shape memory alloy spring 40 acting on the reciprocating ring 42 into rotary motion of the rotatable valve 24. This motion is the result of a change in ambient temperature. For example, if the ambient temperature increases or if an electric current is introduced by wires (not shown), the shape memory alloy spring 40 expands to its non-deformed, extended shape. As illustrated, the base of the shape memory alloy spring 40 rests against the peripheral ring 32 of the rotatable valve 24, thus restricting expansion at the one end. However, the shape memory alloy spring 40 can expand against the reciprocating ring 42 and pushes it away from the peripheral ring 32.

The reciprocating ring 42 is constrained against rotation within the valve cylinder 14 because of the interaction between the anti-rotation ribs 48 and 48' and the opposed grooves 50 and 50' and thus can only move linearly. As the reciprocating ring 42 so moves in response to pressure from the expanding shape memory alloy spring 40, the cam follower 46 moves along the linear portion 37 of the cam follower groove 36 forcing the rotatable valve 24 to rotate between one or the other of an open position and a closed position.

Figure 7:
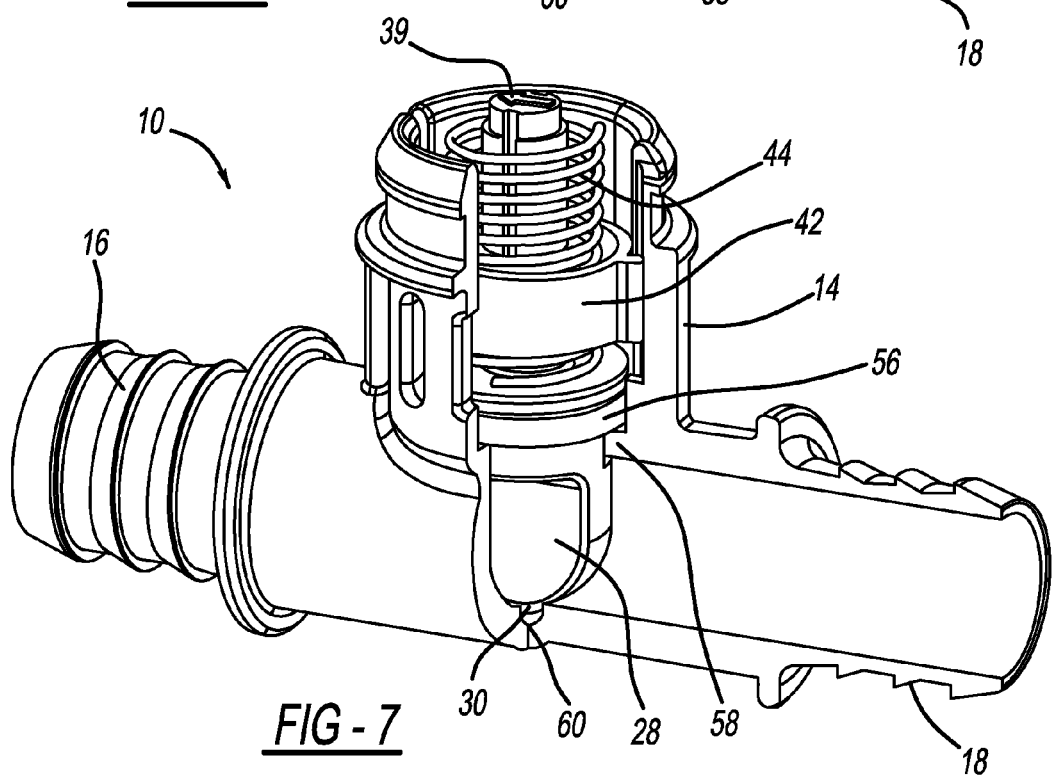
FIG. 7 is a view similar to that of FIG. 6 but showing the valve assembly without portions cut away.

The resulting movement of the reciprocating ring 42 away from the peripheral ring 32 due to the expansion of the shape memory alloy spring 40 and the consequent rotational movement of the rotatable valve 24 results in the closing of the valve 10. This condition is illustrated in FIG. 7 in which the reciprocating ring 42 is moved away to its extreme position relative to the peripheral ring 32 and the flow gate 28 is in its open position, thus allowing the flow of fluid thereby. (It is to be understood that the same movement may result in the flow gate 28 being moved to its closed position instead if the valve 10 is intended for such an application.)

Figure 8:
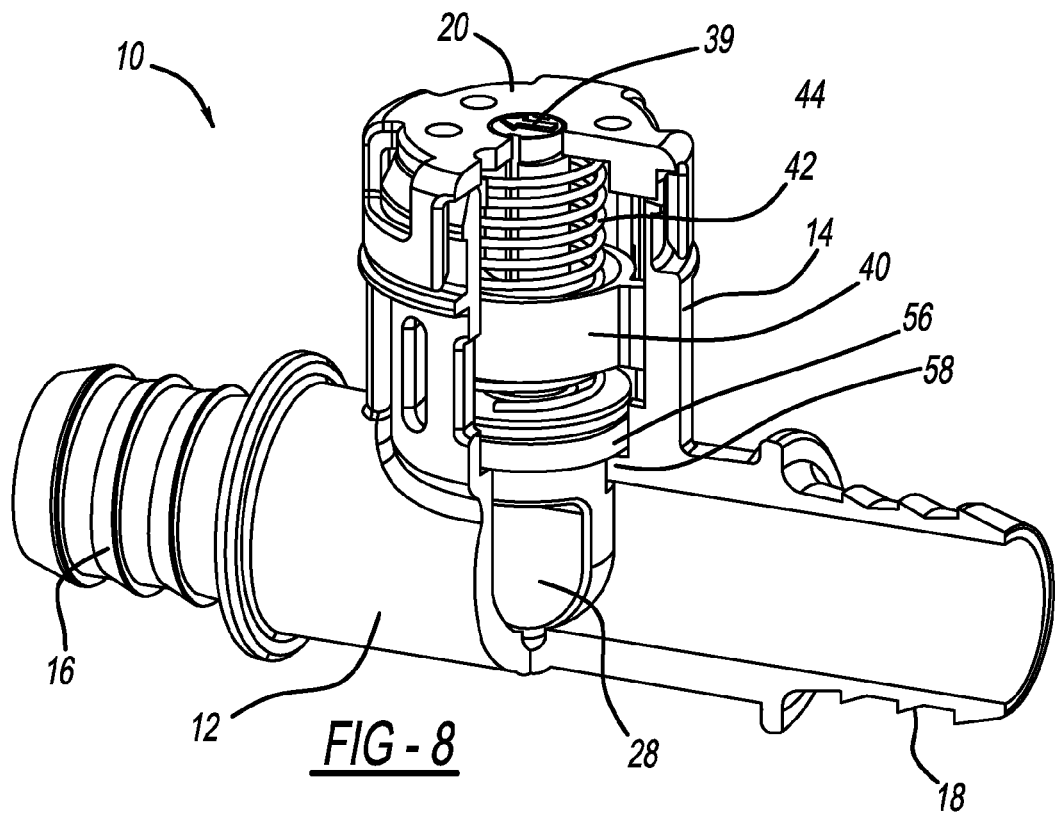
FIG. 8 is a view similar to that of FIG. 7 but showing the cap in place on the valve assembly cylinder.
Figure 9:
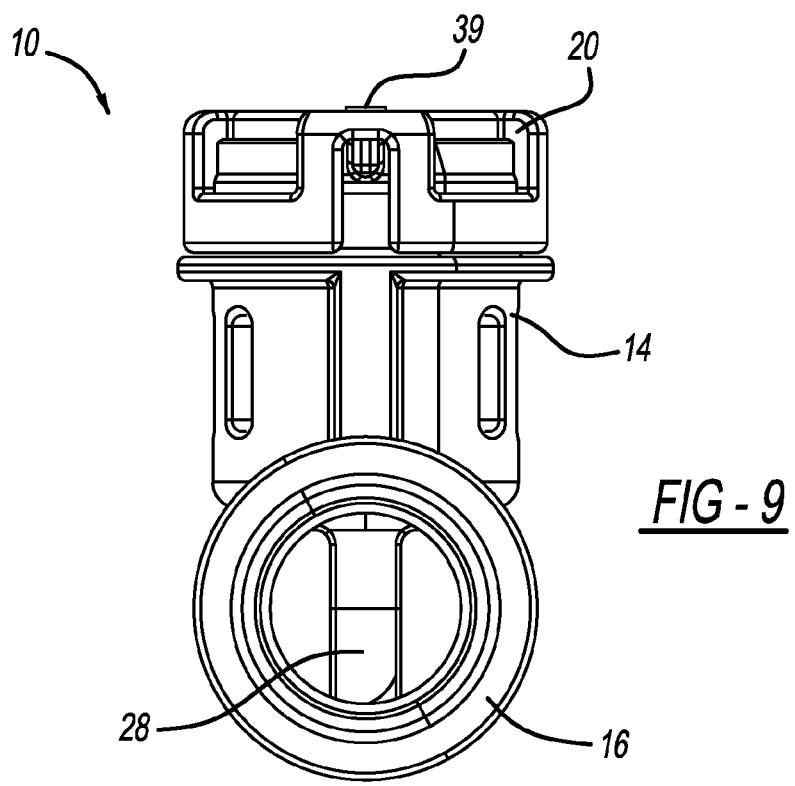
FIG. 9 is an end view of the valve of FIG. 1 shown in its opened position.

FIG. 8 is a view similar to that of FIG. 7 except that the cap 22 is in position on the top of the valve assembly cylinder 14. FIG. 9 is an end view of the valve 10 illustrating the flow gate 28 in the open position as is the case in the valve 10 illustrated in FIGS. 6, 7 and 8.

Figure 10:
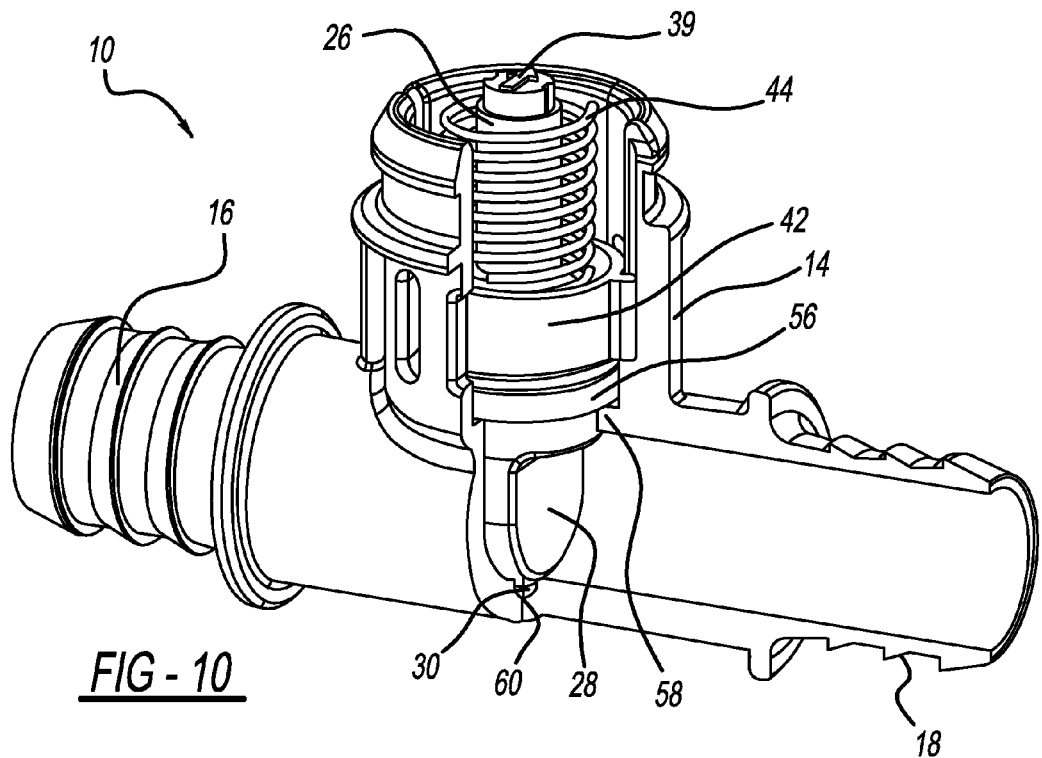
FIG. 10 is a view similar to that of FIG. 7 but showing the valve in its closed position.
Figure 12:
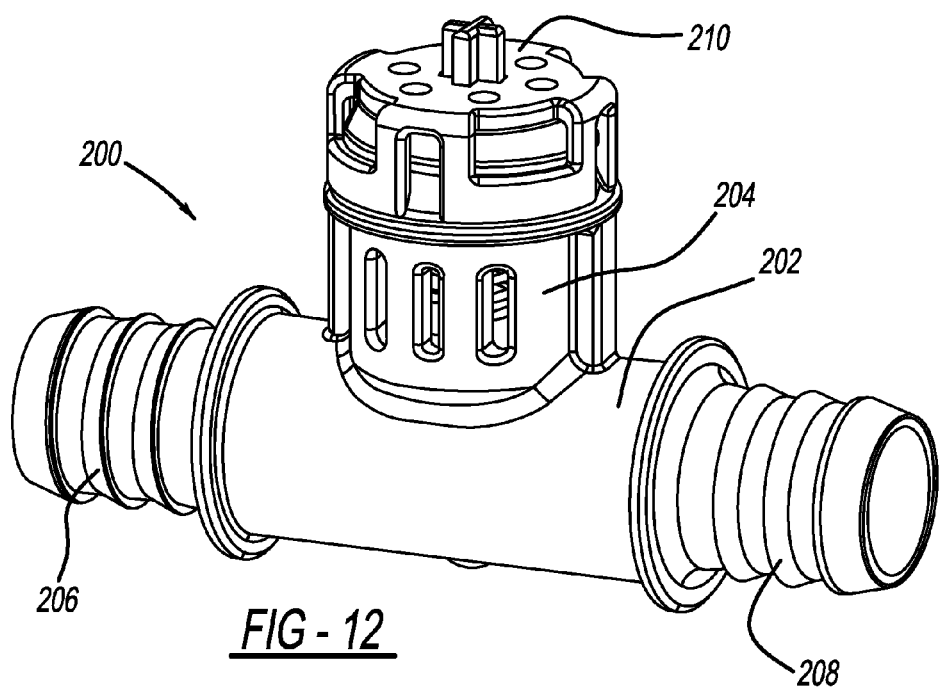
FIG. 12 is a perspective view of a valve having a shape memory alloy spring for moving a valve member according to a third embodiment of the disclosed inventive concept in which the valve is shown in its open position.
Figure 13:
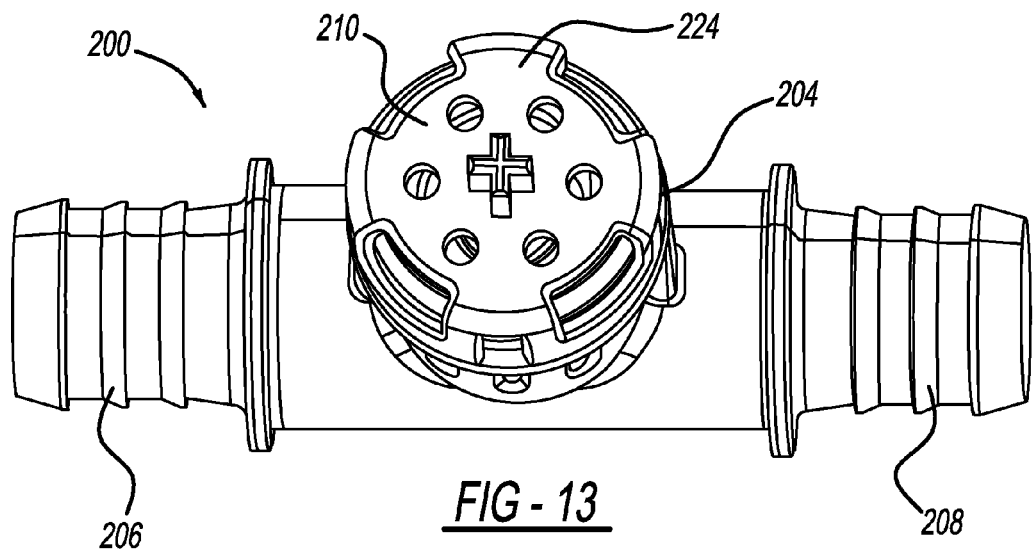
FIG. 13 is a slightly off-center top view of the valve of FIG. 12.

When the ambient temperature drops below a certain threshold or when the electric current is reduced or eliminated, the return spring 44 applies force on the reciprocating ring 42 that overcomes the force of the shape memory alloy spring 40 as the spring assumes its deformed shape having a reduced length and maintains the rotatable valve 24 in its closed or resting position as illustrated in FIG. 10. In this position, the flow gate 28 restricts the passage of fluid thereby. When the temperature rises to a level at or above the specified threshold, the force of the return spring 44 is overcome by the shape memory alloy spring returning to its original, elongated and non-deformed shape and the reciprocating ring 42 is pushed upward, thus causing the rotatable valve 24 to be moved to its open position. In this position, the flow gate 28 allows passage of fluid thereby.

FIGS. 11 and 11A illustrate a second embodiment of the shape memory alloy valve according to the disclosed inventive concept, generally illustrated as 100. FIG. 11 illustrates a longitudinal sectional view of the shape memory alloy valve 100. FIG. 11A illustrates a view of the shape memory alloy valve 100 taken along line 11A-11A of FIG. 11.

Like the shape memory alloy valve 10 discussed above, the shape memory alloy valve 100 may be used in any environment where the flow of either a liquid or a gas needs to be selectively regulated. The valve 100 includes a substantially T-shaped body 102 having a valve assembly cylinder 104, a first port 106 and a second port 108. Of the first port 106 and the second port 108, one is an inlet port and the other is an outlet port. The long axis of the first port 106 is aligned with the long axis of the second port 108, though this is not necessarily the case. As further illustrated in these same figures, the first port 106 and the second port 108 are disposed at right angles with respect to the valve assembly cylinder 104, though this is also not necessarily the case.

The valve 100 further includes a valve assembly cap 110. The valve assembly cap 110 is preferably snap-fitted to the valve assembly cylinder 104, though it may also be attached to the valve assembly cylinder 104 by threading.

A valve assembly 112 is provided substantially within the valve assembly cylinder 104. The valve assembly 112 includes a rotatable valve 114 having a valve stem 116 and a flow gate 118. The valve stem 116 includes a peripheral wall 120 having a cam follower groove 122 formed therein. The cam follower groove 122 includes an arcuate portion 124 for effecting rotary motion of the rotatable valve 114 and a linear portion 126 that allows for assembly of the valve assembly 112. The arcuate portion 124 is continuous with the linear portion 126. A peripheral ring 128 is formed as part of the rotatable valve 114.

The valve assembly 112 includes a shape memory alloy spring 130, a reciprocating ring 132, and a return spring 134. The shape memory alloy spring 130 changes length in response to changes in temperature. One end of the shape memory alloy spring 130 rests against the peripheral ring 128 while the other end of the shape memory alloy spring 130 rests on one side of the reciprocating ring 132. One end of the return spring 134 rests against the cap 110 while the other end of the return spring 134 rests on the other side of the reciprocating ring 132. An O-ring 136 is fitted between the peripheral ring 128 and the base of the valve assembly cylinder 104.

A cam follower 138 extends from the inner wall of the reciprocating ring 132 and is fitted into arcuate portion 124 of the cam follower groove 122 formed in the valve stem 116 of the rotatable valve 114. Extending inwardly from the inner wall of the valve assembly cylinder 104 is a first pair of opposed anti-rotation ribs 140 and 140' that move linearly within a pair of opposed grooves 142 and 142' formed in the exterior surface of the reciprocating ring 132. Optionally and extending inwardly from the inner wall of the valve assembly cylinder 104 is a second pair of opposed anti-rotation ribs 144 and 144' that move linearly within a pair of opposed grooves 146 and 146' also formed in the exterior surface of the reciprocating ring 132.

Operation of the shape memory alloy valve 100 is the same as described above with respect to operation of the shape memory alloy valve 10.

FIGS. 12 through 20 illustrate a third embodiment of the valve of the disclosed inventive concept, generally illustrated as 200. As described above with respect to the shape memory alloy valves 10 and 100, the shape memory alloy valve 200 may be used in any environment where the flow of a either a liquid or a gas needs to be selectively regulated.

The valve 200 includes a substantially T-shaped body 202 having a valve assembly cylinder 204, a first port 206 and a second port 208. Of the first port 206 and the second port 208, one is an inlet port and the other is an outlet port. The long axis of the first port 206 is aligned with the long axis of the second port 208, though this is not necessarily the case. As further illustrated in these same figures, the first port 206 and the second port 208 are disposed at right angles with respect to the valve assembly cylinder 204, though this is also not necessarily the case.

The valve 200 further includes a non-rotatable valve assembly cap 210. The valve assembly cap 210 is preferably snap-fitted to the valve assembly cylinder 204, though it may also be attached to the valve assembly cylinder 204 by threading. Regardless of its method of attachment, the non-rotatable valve assembly cap 210 is locked against rotation relative to the valve assembly cylinder 204.

Figure 16:
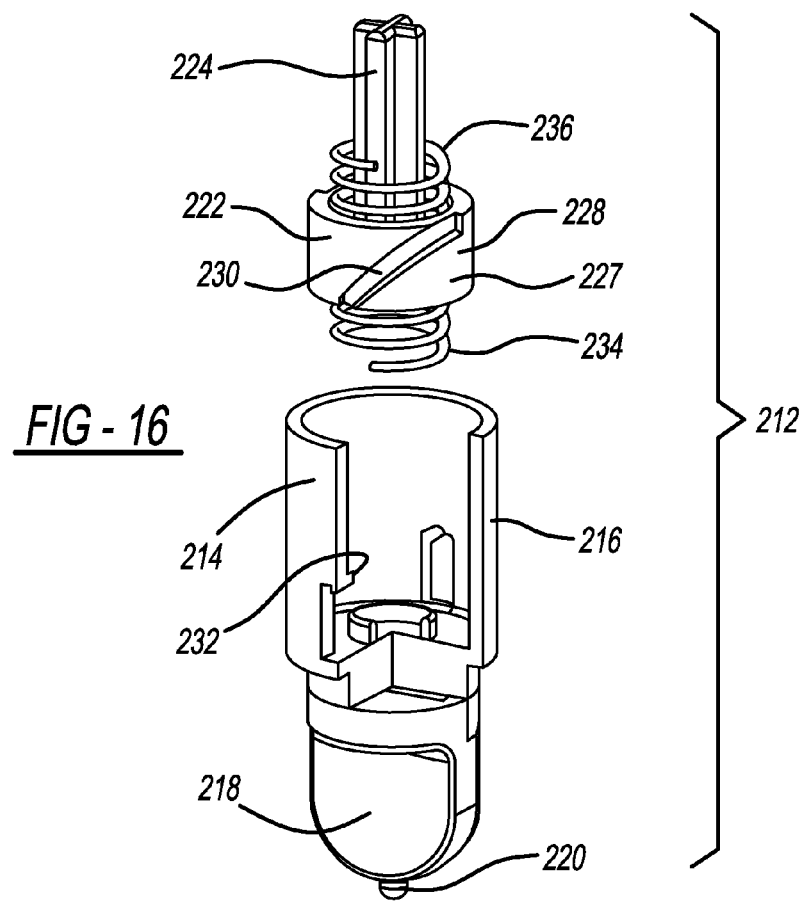
FIG. 16 is a perspective view of the valve assembly of the valve of FIG. 12.
Figure 14:
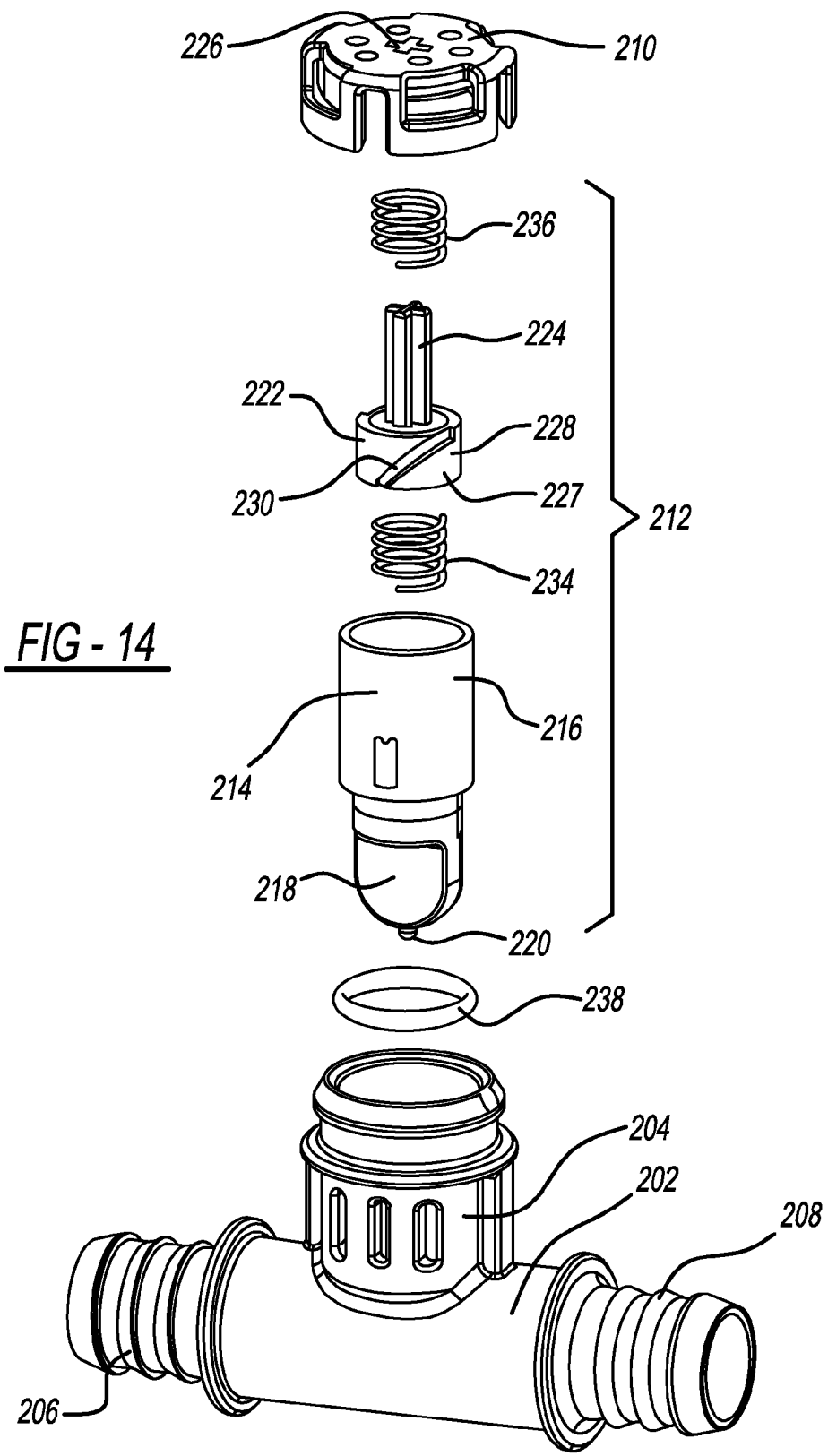
FIG. 14 is an exploded view of the valve of FIG. 12.
Figure 15:
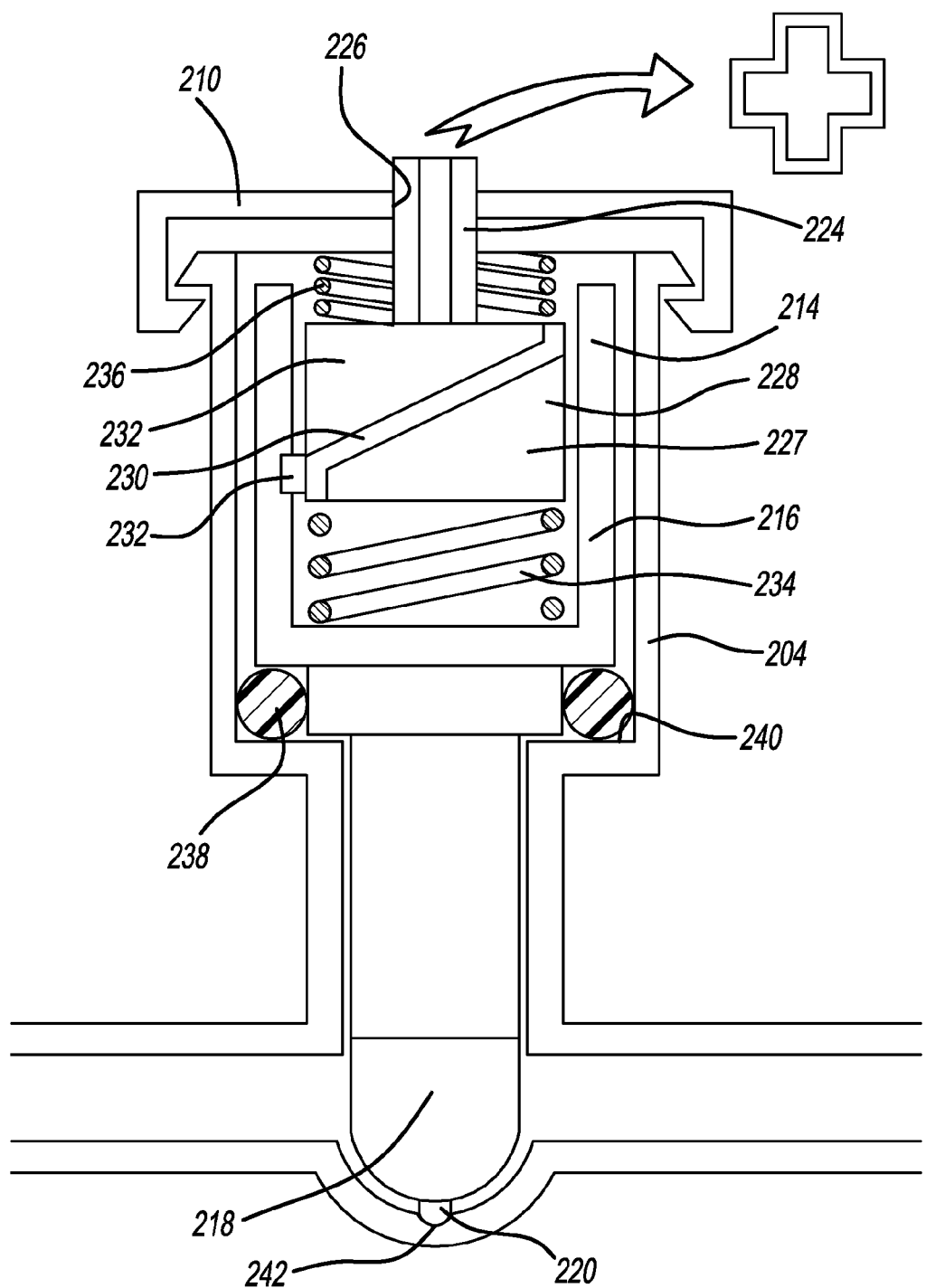
FIG. 15 is sectional view taken along the long axis of the majority portion of the shape memory alloy valve of FIG. 12.

In FIG. 14, an exploded view of the valve 10 of the disclosed inventive concept is illustrated. In FIG. 15, a sectional view taken along the long axis of a portion of the shape memory valve 200 is illustrated. In FIG. 16, a view of the primary portions of the valve assembly is illustrated in partial cross-section.

Referring to FIGS. 14, 15 and 16, a valve assembly 212 is provided substantially within the valve assembly cylinder 204. The valve assembly 212 includes a rotatable valve 214 having a rotatable valve cylinder 216 with a flow gate 218 extending therefrom. A locator pin 220 extends from the base of the flow gate 218.

A reciprocating body 222 having a fluted stem 224 is provided in operative association with the valve assembly cylinder 204. A non-limiting configuration of the fluted stem 224 is illustrated in FIG. 15 as illustrated by the arrow. A slotted opening 226 is formed in the non-rotatable valve assembly cap 210. The fluted stem 224 mates with the slotted opening 226 such that reciprocating motion is allowed but rotational movement is prevented.

The reciprocating body 222 includes a cylindrical body 227 having a peripheral wall 228. A cam follower groove 230 is formed in the peripheral wall 228 of the cylindrical body 227. A cam follower 232 is illustrated in FIG. 15 extending inwardly from the interior wall of the valve assembly cylinder 204.

The valve assembly 212 further includes a shape memory alloy spring 234 and a return spring 236. Like the shape memory springs 40 and 130 discussed above with respect to the first and second embodiments respectively of the disclosed inventive concept, the shape memory alloy spring 234 changes length in response to changes in temperature. One end of the shape memory alloy spring 234 rests against the base of the rotatable valve cylinder 216 while the other end of the shape memory alloy spring 234 rests against the underside of the reciprocating body 222. One end of the return spring 236 rests against the underside of the cap 210 while the other end of the return spring 236 rests against the cylindrical body 227 of the reciprocating body 222.

Figure 17:
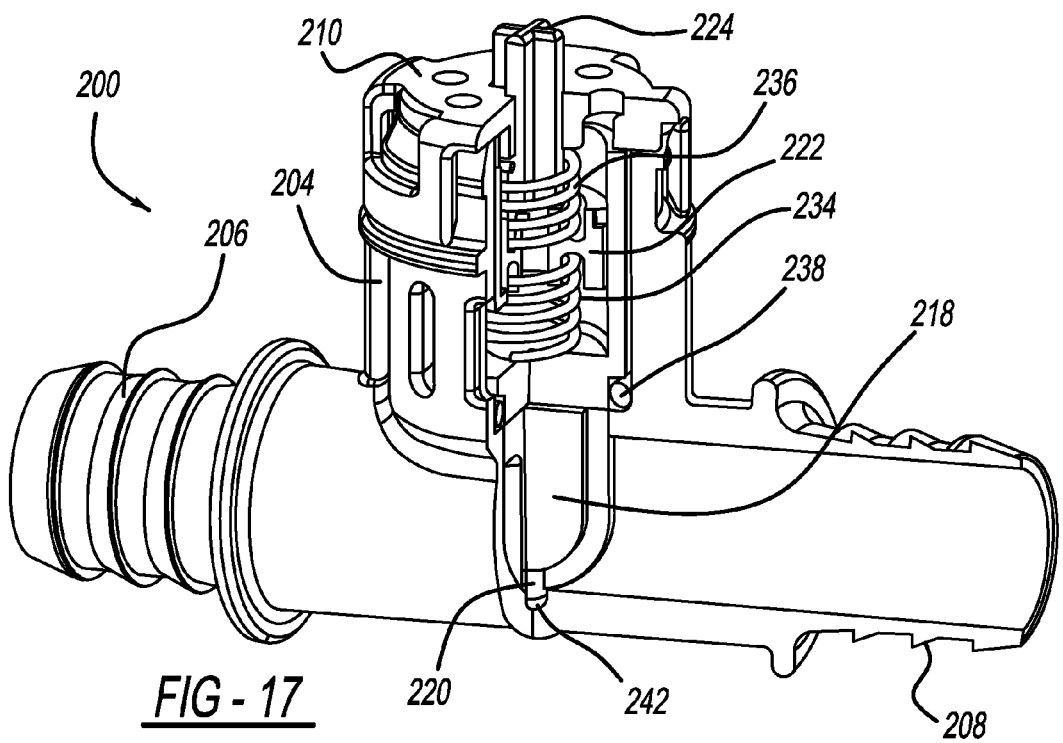
FIG. 17 is a perspective view similar to that of FIG. 12 but illustrating the valve housing, the valve assembly and a portion of one of the tubes partially cut away.

FIG. 17 illustrates the valve assembly 212 disposed within the valve assembly cylinder 204. The valve assembly 212 is shown with portions of the shape memory alloy spring 234 and the return spring 236 cut away. The flow gate 218 is illustrated in its open position. An O-ring 238 provides a fluid-tight seal between the underside of the rotatable valve cylinder 216 of the rotatable valve 214 and a seat 240 formed within the valve assembly cylinder 204. Additional O-rings may be provided as necessary. The locator pin 220 extending from the flow gate 218 is rotatably seated within a recessed area 242.

The length of the shape memory alloy spring 234 changes in response to changes in ambient temperature or to the presence or absence of an electric current. If the ambient temperature or the electric current increases, the shape memory alloy spring 234 lengthens to assume its original, elongated and non-deformed shape. This lengthening causes the shape memory alloy spring 234 to push at its lowermost end against the inner wall of the base of the rotatable valve cylinder 216 and at its uppermost end against the underside of the reciprocating body 222.

Figure 18:
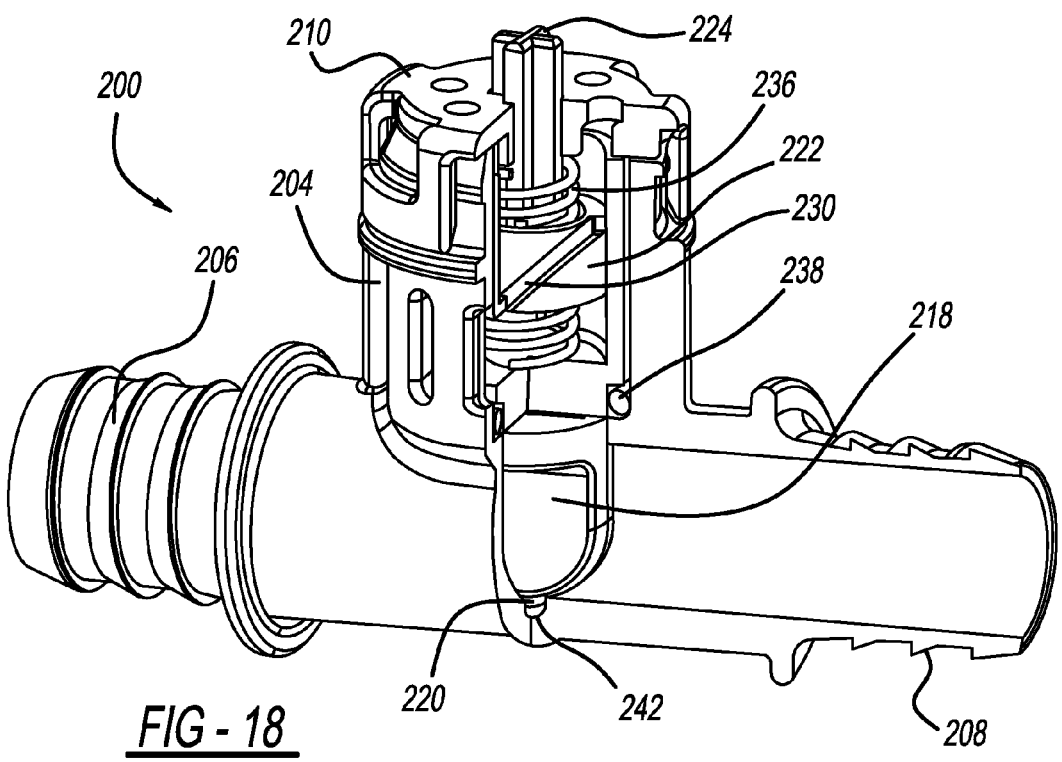
FIG. 18 is a perspective view similar to that of FIG. 17 but illustrating the cam follower mechanism and associated valve in its open position.
Figure 19:
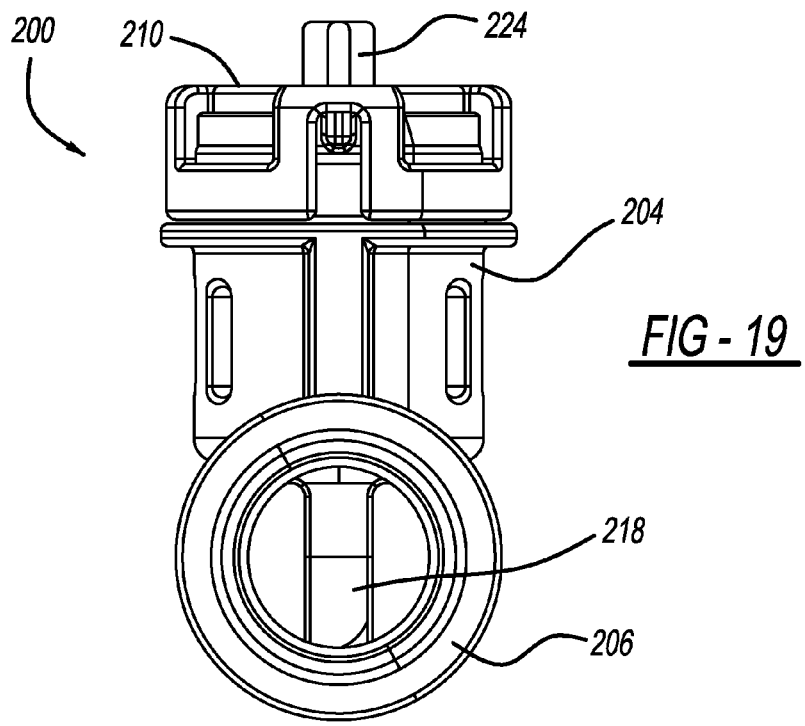
FIG. 19 is an end view of the valve of FIG. 12.

Because the rotatable valve cylinder 216 is constrained against vertical movement, the reciprocating body 222 is vertically moved toward the cap 210, thus forcing the cam follower 232 that extends from the inner wall of the rotatable valve cylinder 216 to move in the cam follower groove 230 formed in the peripheral wall 228 of the cylindrical body 227. This results in the linear motion of the reciprocating body 222 being translated into rotational movement of the rotatable valve cylinder 216. As a consequence, the flow gate 218 is rotated to the open position as illustrated in FIG. 18 which is a perspective of the valve 200 shown in partial cutaway and FIG. 19 which is an end view of the valve 200.

Figure 20:
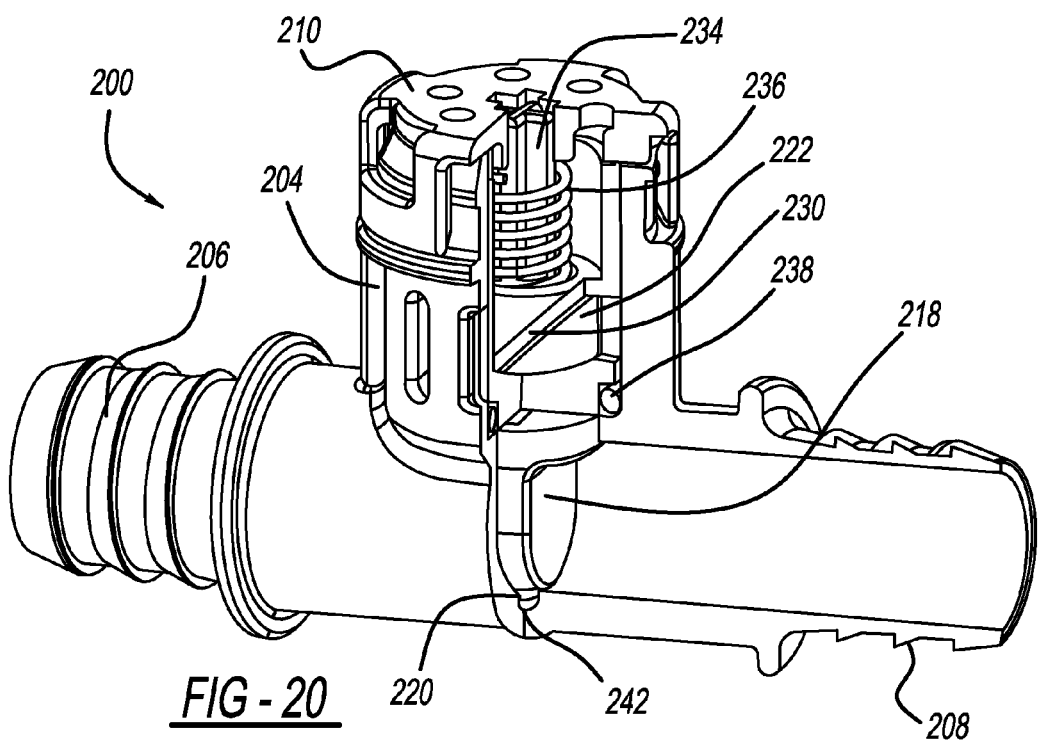
FIG. 20 is a perspective view similar to that of FIG. 18 but illustrating the cam follower mechanism and associated valve in its closed position.

When the ambient temperature drops below a certain threshold or if the electric current is reduced or eliminated, the return spring 236 applies force on the upper surface of the reciprocating body 222 that overcomes the force of the shape memory alloy spring 234 as the spring assumes its deformed shape having a reduced length. Because the rotatable valve cylinder 216 is constrained against vertical movement, the reciprocating body 222 is vertically moved downward and away from the cap 210, thus forcing the cam follower 232 that extends from the inner wall of the rotatable valve cylinder 216 to move in the cam follower groove 230 formed in the peripheral wall 228 of the cylindrical body 227. This results in linear motion of the reciprocating body 222 being translated into rotational movement of the rotatable valve cylinder 216. As a consequence, the flow gate 218 is rotated to the closed position as illustrated in FIG. 20 which illustrates a partial cutaway view of the valve 200.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A fluid control valve comprising:
a valve assembly cylinder;
a valve assembly cap fitted to said cylinder;
a fluid inlet and a fluid outlet, said inlet and said outlet being associated with said cylinder;
a first member having a peripheral ring and a cam follower groove, said groove having an arcuate portion;
a second member having a radial surface and a cam follower operatively associated with said groove, said second member having a return spring side and a valve-facing side;
a fluid flow gate associated with one of said members and to said inlet and said outlet;
a return spring positioned on said return spring side of said second member; and
a shape memory alloy spring positioned between said valve-facing side of said second member and said peripheral ring of said first member.

2. The fluid control valve of claim 1 wherein said first member is a rotating valve having said flow gate fitted thereto.

3. The fluid control valve of claim 2 further including a flow direction indicator.

4. The fluid control valve of claim 2 wherein said cam follower groove includes a straight portion.

5. The fluid control valve of claim 2 wherein said second member is a reciprocating ring having at least one anti-rotation rib formed thereon.

6. The fluid control valve of claim 5 wherein said valve assembly cylinder has an inner wall and said inner wall has at least one rib-receiving groove formed thereon.

7. A fluid control valve comprising:
a valve assembly cylinder;
a valve assembly cap fitted to said cylinder;
a fluid inlet and a fluid outlet, said inlet and said outlet being associated with said cylinder;
a rotating member having a fluid flow gate, a cam follower groove, and a flow direction indicator, said rotating member having peripheral ring and an elongated stem;
a reciprocating member operatively associated with said rotating member such that axial movement of said reciprocating member is translated into rotational movement of said rotating member, said reciprocating member having a return spring side and a shape memory alloy spring side, said reciprocating member having at least one anti-rotation rib formed thereon and a cam follower moveable in said groove and wherein said valve assembly cylinder has an inner wall and said inner wall has at least one rib-receiving groove formed thereon;
a return spring positioned against said return spring side of said reciprocating member;
said return spring associated with said reciprocating member; and
a shape memory alloy spring positioned around at least a portion of said elongated stem, whereby said shape memory alloy spring acts upon said reciprocating member.

8. A fluid control valve comprising:
a valve assembly cylinder;
a valve assembly cap fitted to said cylinder;
a fluid inlet and a fluid outlet, said inlet and said outlet being associated with said cylinder;
a first member having a cam follower groove, said first member being a rotatable member having a first end that is a valve and a second end opposite said first end that extends through said valve assembly cap;
a second member having a cam operatively associated with said groove, said second member being a reciprocating ring;
a fluid flow gate associated with one of said members, said inlet and said outlet;
a resilient member associated with one of said members; and
a shape memory alloy spring associated with said one of said members.

9. The fluid control valve of claim 8 wherein said resilient member is a return spring.

* * * * *